United States Patent
Yamashita et al.

(10) Patent No.: US 10,042,409 B2
(45) Date of Patent: Aug. 7, 2018

(54) DEVICES AND METHODS FOR PREVENTING IMAGE ARTIFACTS ON TOUCH SENSITIVE ELECTRONIC DISPLAYS

(71) Applicant: Apple Inc., Cupertino, CA (US)

(72) Inventors: Keitaro Yamashita, Cupertino, CA (US); Majid Gharghi, Cupertino, CA (US); Ting-Kuo Chang, Cupertino, CA (US); Abbas Jamshidi Roudbari, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/986,371

(22) Filed: Dec. 31, 2015

(65) Prior Publication Data
US 2017/0090631 A1    Mar. 30, 2017

Related U.S. Application Data

(60) Provisional application No. 62/233,050, filed on Sep. 25, 2015.

(51) Int. Cl.
*G06F 1/32* (2006.01)
*G06F 3/041* (2006.01)
*G06F 3/044* (2006.01)
*G09G 3/20* (2006.01)

(52) U.S. Cl.
CPC .......... *G06F 1/3203* (2013.01); *G06F 1/3215* (2013.01); *G06F 1/3218* (2013.01); *G06F 1/3262* (2013.01); *G06F 1/3265* (2013.01); *G06F 3/044* (2013.01); *G06F 3/0412* (2013.01); *G06F 3/0416* (2013.01); *G09G 3/2092* (2013.01); *G09G 2330/02* (2013.01); *G09G 2330/06* (2013.01); *Y02D 10/153* (2018.01)

(58) Field of Classification Search
CPC ............................... G06F 3/044; G06F 3/0412
See application file for complete search history.

(56) References Cited

U.S. PATENT DOCUMENTS

| | | | |
|---|---|---|---|
| 9,513,732 B2* | 12/2016 | Zhao | G06F 3/044 |
| 2008/0309627 A1* | 12/2008 | Hotelling | G02F 1/134363 345/173 |
| 2013/0141343 A1* | 6/2013 | Yu | G06F 3/044 345/173 |
| 2013/0141348 A1* | 6/2013 | Jamshidi-Roudbari | G06F 3/044 345/173 |
| 2013/0278581 A1 | 10/2013 | Al-Dahle et al. | |
| 2013/0328797 A1 | 12/2013 | Al-Dahle et al. | |
| 2014/0368462 A1 | 12/2014 | Shepelev | |

(Continued)

*Primary Examiner* — Xuemei Zheng
(74) *Attorney, Agent, or Firm* — Fletcher Yoder PC

(57) ABSTRACT

Methods and devices useful in discharging an aberrant charge on a touch sensitive display of an electronic device are provided. By way of example, a an electronic device includes a power management and control circuitry configured to receive a first voltage signal and a second voltage signal from a display subsystem of a display of the electronic device, receive a third voltage signal from a touch subsystem of the display, provide a power signal to the display subsystem to activate the display subsystem when the display is determined to be in a temporarily inactive state. Providing the power signal to the display subsystem comprises discharging an aberrant charge based on the third voltage signal.

19 Claims, 12 Drawing Sheets

(56) References Cited

U.S. PATENT DOCUMENTS

2015/0002407 A1     1/2015   Knausz et al.
2015/0035758 A1     2/2015   Nandakumar et al.
2016/0291789 A1*   10/2016   Zhai ..................... G06F 3/0412

* cited by examiner

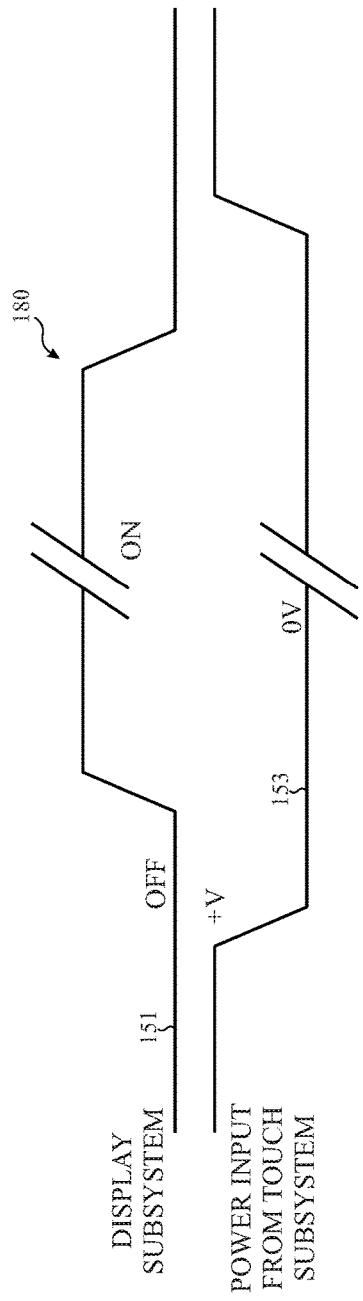

DEVICES AND METHODS FOR PREVENTING IMAGE ARTIFACTS ON TOUCH SENSITIVE ELECTRONIC DISPLAYS

CROSS REFERENCE TO RELATED APPLICATIONS

This application is a Non-Provisional patent application of U.S. Provisional Patent Application No. 62/233,050, entitled "Devices and Method for Preventing Image Artifacts on Touch Sensitive Electronic Displays", filed Sep. 25, 2015, which is herein incorporated by reference in its entirety and for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic displays may be found in a variety of devices, such as computer monitors, televisions, instrument panels, mobile phones, and clocks. One type of electronic display, known as a liquid crystal display (LCD), displays images by modulating the amount of light allowed to pass through a liquid crystal layer within pixels of the LCD. In general, LCDs modulate the light passing through each pixel by varying a voltage difference between a pixel electrode and a common electrode (VCOM). This creates an electric field that causes the liquid crystal layer to change alignment. The change in alignment of the liquid crystal layer causes more or less light to pass through the pixel. By changing the voltage difference supplied to each pixel, images are produced on the LCD. Another type of electronic display, known as an organic light-emitting diode (OLED) display, which may include light-emitting devices including one or more layers of organic materials interposed between a pixel electrode and a common electrode (VCOM). Specifically, the OLED display may display images by driving individual OLED pixels to store image data and image brightness data. In either case of LCDs or OLEDs, bias voltages or other voltage perturbations due to user touches on the display could produce visible artifacts known as muras or flicker. It may be useful to provide electronic displays with reduced or eliminated mura or flicker artifacts.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Various embodiments of the present disclosure relate to methods and devices for discharging an aberrant charge on a touch sensitive display of an electronic device. By way of example, a an electronic device includes a power management and control circuitry configured to receive a first voltage signal and a second voltage signal from a display subsystem of a display of the electronic device, receive a third voltage signal from a touch subsystem of the display, provide a power signal to the display subsystem to activate the display subsystem when the display is determined to be in a temporarily inactive state. Providing the power signal to the display subsystem comprises discharging an aberrant charge based on the third voltage signal.

Various refinements of the features noted above may exist in relation to various aspects of the present disclosure. Further features may also be incorporated in these various aspects as well. These refinements and additional features may exist individually or in any combination. For example, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 11 is a logic table that illustrates the operation of the power management and control circuitry of FIG. 8, in accordance with an embodiment;

FIG. 12, a timing diagram based on the logic table of FIG. 11, in accordance with an embodiment;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate to methods and devices for discharging an aberrant charge on a touch sensitive display of an electronic device. Indeed, the present embodiments may include providing a power management and control circuitry that may be used to prevent, for example, disturbance charges and/or other aberrant charge from accumulating on the pixels of the touch sensitive display during the time the touch sensitive display is "OFF" (e.g., temporarily deactivated). Specifically, based on, for example, the polarity and/or magnitude of the upper rail voltage signal (e.g., "VGH") from the display subsystem and the lower rail voltage signal (e.g., "VGL") from the display subsystem and/or a touch voltage signal from the touch subsystem, the power management and control circuitry may generate and output a gate signal output to the display subsystem to control TFTs to turn "ON" and "OFF," and thus discharge any aberrant charges (e.g., due to voltages of the touch subsystem coupling to components of the display subsystem components during the time the display subsystem is "OFF")). In this way, the possibility of image artifacts (e.g., mura artifacts, image sticking) becoming apparent on the touch sensitive display may be reduced or substantially eliminated.

Figure 1:
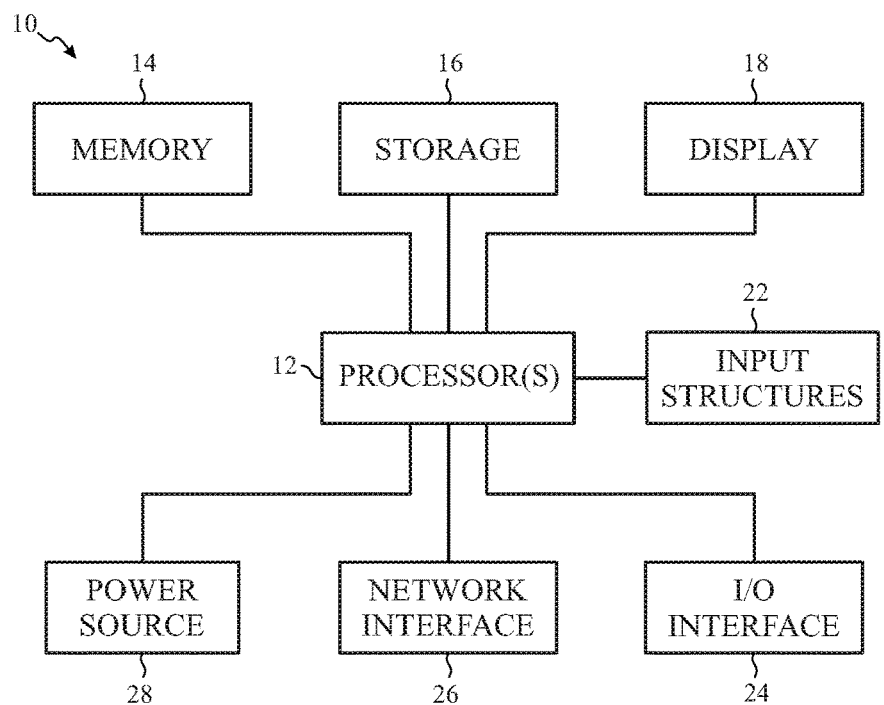
FIG. 1 is a schematic block diagram of an electronic device including a display, in accordance with an embodiment.

With the foregoing in mind, a general description of suitable electronic devices that may include a display and data processing circuitry useful in discharging an aberrant charge on the VCOM of an electronic display and harvesting energy from the VCOM of the electronic display is provided. Turning first to FIG. 1, an electronic device 10 according to an embodiment of the present disclosure may include, among other things, one or more processor(s) 12, memory 14, nonvolatile storage 16, a display 18 input structures 22, an input/output (I/O) interface 24, network interfaces 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
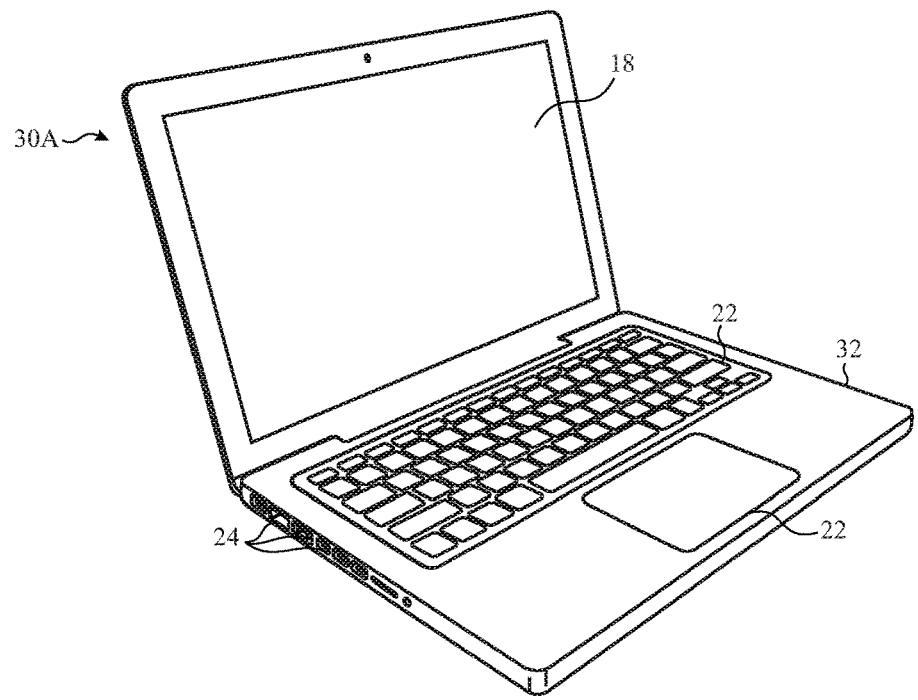
FIG. 2 is a perspective view of a notebook computer representing an embodiment of the electronic device of FIG. 1.
Figure 3:
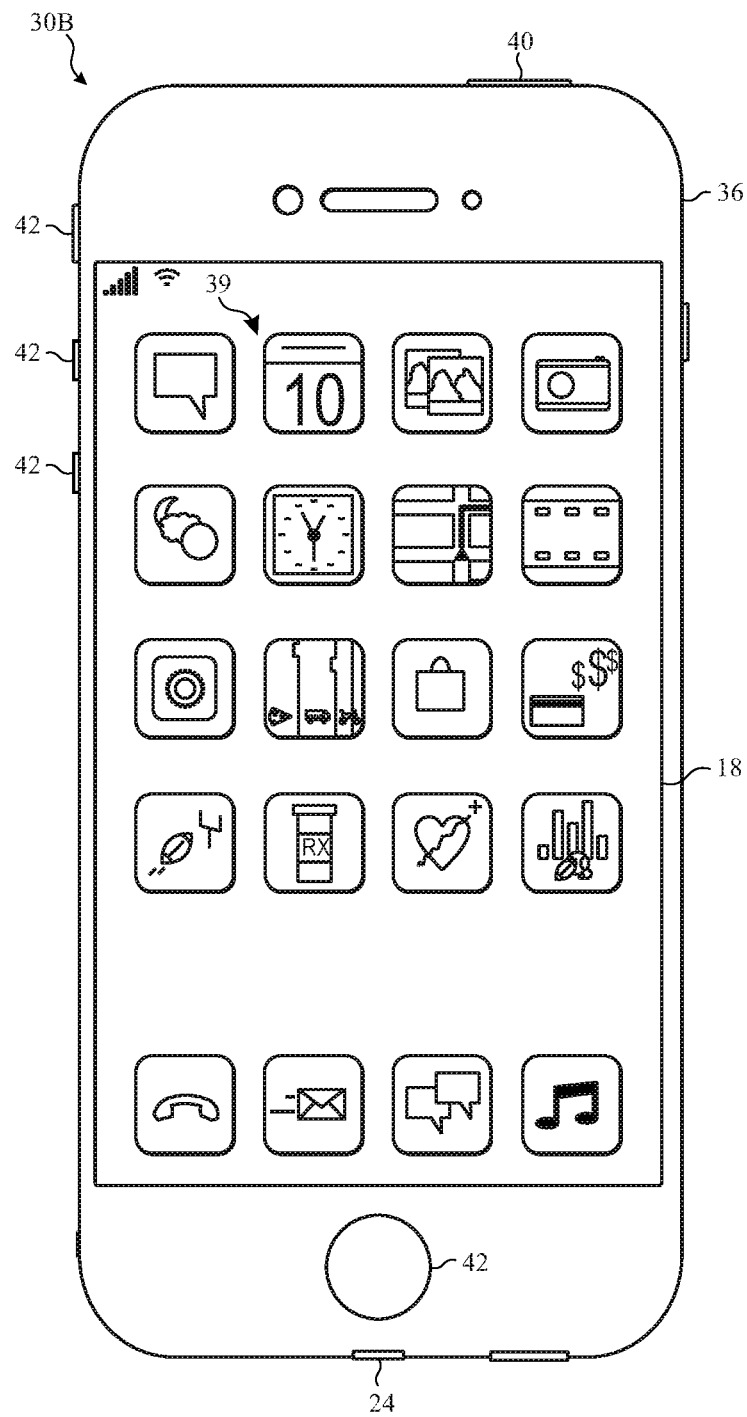
FIG. 3 is a front view of a hand-held device representing another embodiment of the electronic device of FIG. 1.
Figure 4:
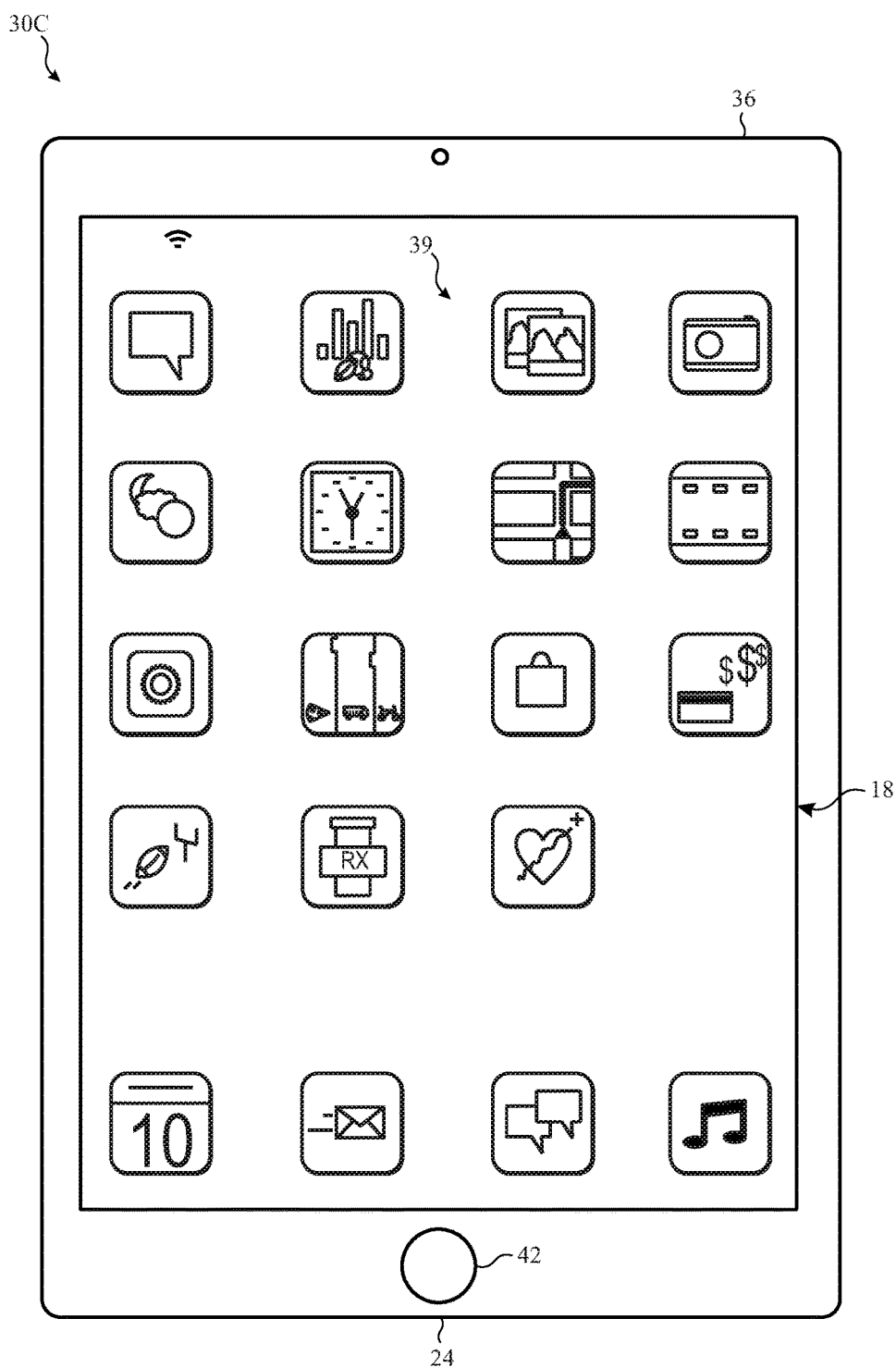
FIG. 4 is a front view of another hand-held device representing another embodiment of the electronic device of FIG. 1.
Figure 5:
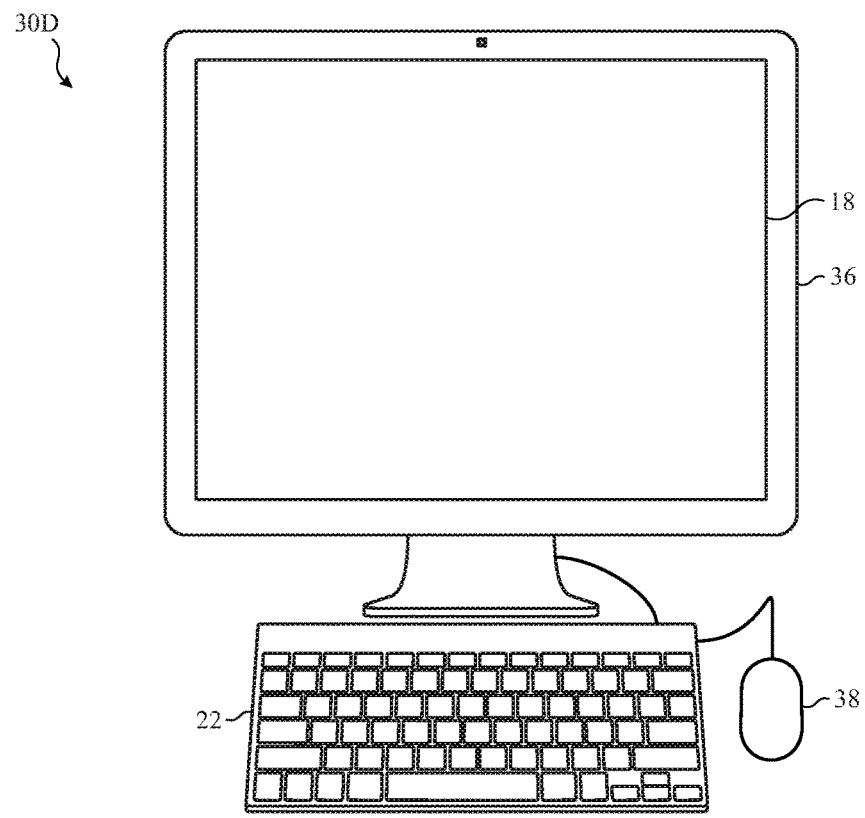
FIG. 5 is a front view of a desktop computer representing another embodiment of the electronic device of FIG. 1.

By way of example, the electronic device 10 may represent a block diagram of the notebook computer depicted in FIG. 2, the handheld device depicted in FIG. 3, the desktop computer depicted in FIG. 4, the wearable electronic device depicted in FIG. 5, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile memory 16 to perform various algorithms Such programs or instructions executed by the processor(s) 12 may be stored in any suitable article of manufacture that may include one or more tangible, computer-readable media at least collectively storing the instructions or routines, such as the memory 14 and the nonvolatile storage 16. The memory 14 and the non-volatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels. Further, in some embodiments, the display 18 may include a light source (e.g., backlight) that may be used to emit light to illuminate displayable images on the display 18. Indeed, in some embodiments, as will be further appreciated, the light source (e.g., backlight) may include any type of suitable lighting device such as, for example, cold cathode fluorescent lamps (CCFLs), hot cathode fluorescent lamps (HCFLs), and/or light emitting diodes (LEDs), or other light source that may be utilize to provide highly backlighting.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a $3^{rd}$ generation (3G) cellular network, $4^{th}$ generation (4G) cellular network, or long term evolution (LTE) cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra Wideband (UWB), alternating current (AC) power lines, and so forth.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing or enclosure 32, a display 18, input structures 22, and ports of an I/O interface 24. In one embodiment, the input structures 22 (such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif.

The handheld device 30B may include an enclosure 36 to protect interior components from physical damage and to shield them from electromagnetic interference. The enclosure 36 may surround the display 18, which may display indicator icons 39. The indicator icons 39 may indicate, among other things, a cellular signal strength, Bluetooth connection, and/or battery life. The I/O interfaces 24 may open through the enclosure 36 and may include, for example, an I/O port for a hard wired connection for charging and/or content manipulation using a standard connector and protocol, such as the Lightning connector provided by Apple Inc., a universal service bus (USB), or other similar connector and protocol.

User input structures 42, in combination with the display 18, may allow a user to control the handheld device 30B. For example, the input structure 40 may activate or deactivate the handheld device 30B, the input structure 42 may navigate user interface to a home screen, a user-configurable application screen, and/or activate a voice-recognition feature of the handheld device 30B, the input structures 42 may provide volume control, or may toggle between vibrate and ring modes. The input structures 42 may also include a microphone may obtain a user's voice for various voice-related features, and a speaker may enable audio playback and/or certain phone capabilities. The input structures 42 may also include a headphone input may provide a connection to external speakers and/or headphones.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (PC) by another manufacturer. A similar enclosure 36 may be provided to protect and enclose internal components of the computer 30D such as the display 18. In certain embodiments, a user of the computer 30D may interact with the computer 30D using various peripheral input devices, such as the input structures 22 or mouse 38, which may connect to the computer 30D via a wired and/or wireless I/O interface 24.

Figure 6:
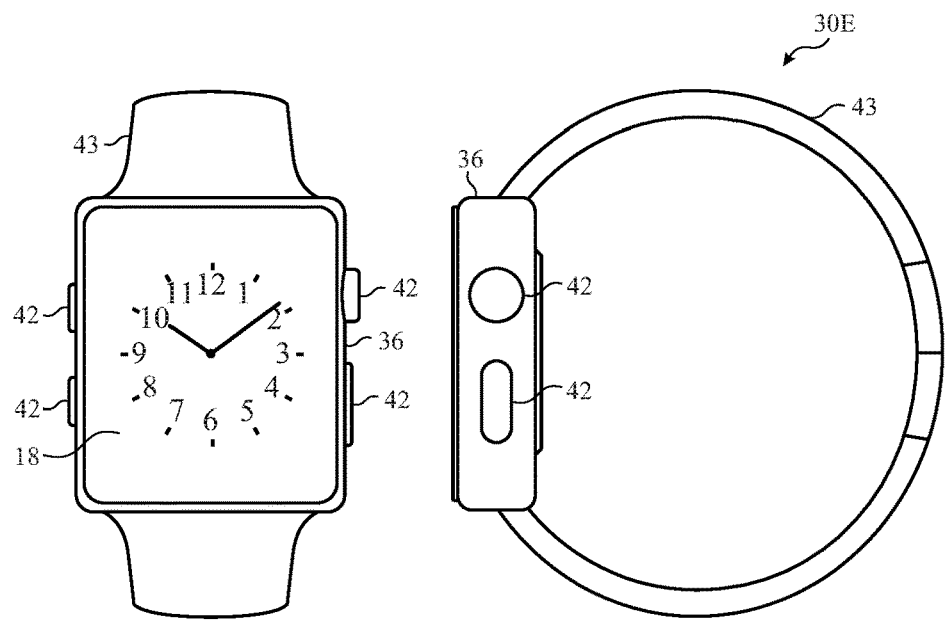
FIG. 6 is a front view of a wearable electronic device representing another embodiment of the electronic device of FIG. 1.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 43, may be an Apple Watch® by Apple, Inc. However, in other embodiments, the wearable electronic device 30E may include any wearable electronic device such as, for example, a wearable exercise monitoring device (e.g., pedometer, accelerometer, heart rate monitor), or other device by another manufacturer. The display 18 of the wearable electronic device 30E may include a touch screen (e.g., LCD, OLED display, active-matrix organic light emitting diode (AMOLED) display, and so forth), which may allow users to interact with a user interface of the wearable electronic device 30E.

In certain embodiments, as previously noted above, each embodiment (e.g., notebook computer 30A, handheld device 30B, handheld device 30C, computer 30D, and wearable electronic device 30E) of the electronic device 10 may include power management and control circuitry. Indeed, as will be further appreciated with respect to FIGS. 10-15, the power management and control circuitry may supply power to both a display subsystem and a touch subsystem of the display 18 to provide an external power supply to the display subsystem to prevent aberrant charges from accumulating on the pixels of the display 18 during the time the display subsystem is "OFF" (e.g., deactivated or temporarily inactive).

Figure 7:
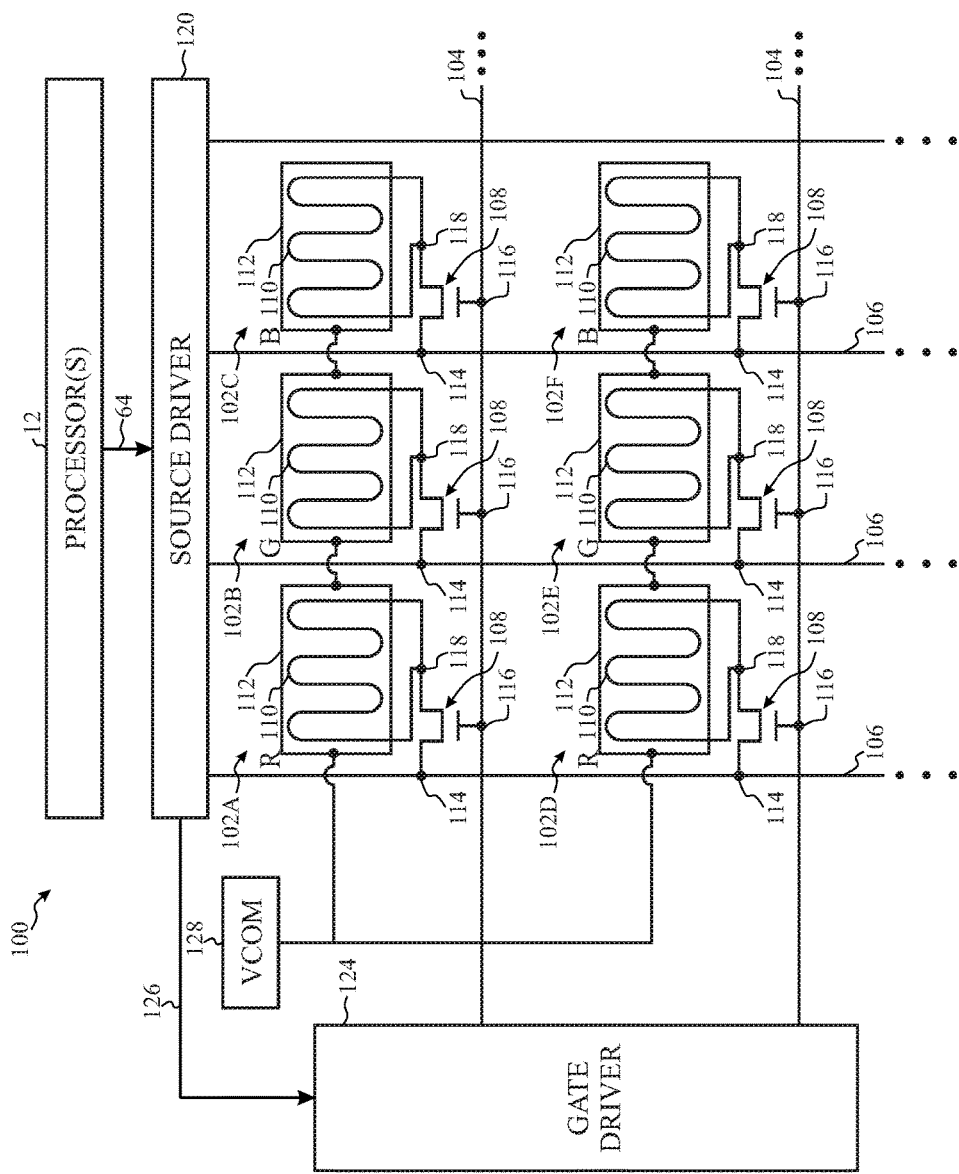
FIG. 7 is a circuit diagram of switching a display circuitry of pixels, in accordance with an embodiment.

Among the various components of an electronic display 18 may be a pixel array 100, as shown in FIG. 7. As illustrated, FIG. 7 generally represents a circuit diagram of circuitry of the display 18. In particular, the pixel array 100 of the display 18 may include a number of unit pixels 102 disposed in a pixel array or matrix. In such an array, each unit pixel 102 may be defined by the intersection of rows and columns, represented by gate lines 104 (also referred to as scanning lines), and source lines 106 (also referred to as data lines), respectively. Although only six unit pixels 102, referred to individually by the reference numbers 102A-102F, respectively, are shown for purposes of simplicity, it should be understood that in an actual implementation, each source line 106 and gate line 104 may include hundreds or thousands of such unit pixels 102. Each of the unit pixels 102 may represent one of three subpixels that respectively filters only one color (e.g., red, blue, or green) of light. For purposes of the present disclosure, the terms "pixel," "sub-pixel," and "unit pixel" may be used largely interchangeably. Further, in certain embodiments, pixel data supplied to the pixels 102 of the display 18 may be considered a "frame" of pixel data.

In the presently illustrated embodiment, each unit pixel 102 includes a thin film transistor (TFT) 108 for switching a data signal supplied to a respective pixel electrode 110. The potential stored on the pixel electrode 110 relative to a potential of a common electrode 112, which may be shared by other pixels 102, may generate an electrical field sufficient to alter the arrangement of a liquid crystal layer of the display 18. In the depicted embodiment of FIG. 7, a source 114 of each TFT 108 may be electrically connected to a source line 106 and a gate 116 of each TFT 108 may be electrically connected to a gate line 104. A drain 118 of each TFT 108 may be electrically connected to a respective pixel electrode 110. Each TFT 108 may serve as a switching element that may be activated and deactivated for a period of time based on the respective presence or absence of a scanning or activation signal on the gate lines 104 that are applied to the gates 116 of the TFTs 108.

When activated, a TFT 108 may store the image signals (e.g., image data signal 66) received via the respective source line 106 as a charge upon its corresponding pixel electrode 110. As noted above, the image signals stored by the pixel electrode 110 may be used to generate an electrical field between the respective pixel electrode 110 and a common electrode 112. This electrical field may align the liquid crystal molecules within the liquid crystal layer to modulate light transmission through the pixel 102. Thus, as the electrical field changes, the amount of light passing through the pixel 102 may increase or decrease. In general, light may pass through the unit pixel 102 at an intensity corresponding to the applied voltage from the source line 106.

The display 18 also may include a source driver integrated circuit (IC) 120, which may include a processor, microcontroller, or application specific integrated circuit (ASIC), that controls the display pixel array 100 by receiving image data 66 from the processor(s) 12 and sending corresponding image signals to the unit pixels 102 of the pixel array 100. It should be understood that the source driver 120 may be a chip-on-glass (COG) component on a TFT glass substrate, a component of a display flexible printed circuit (FPC), and/or a component of a printed circuit board (PCB) that is connected to the TFT glass substrate via the display FPC. Further, the source driver 120 may include any suitable article of manufacture having one or more tangible, computer-readable media for storing instructions that may be executed by the source driver 120. In addition, the source driver 120 may include the display control circuitry 136. In some embodiments, the display control circuitry 136 is not part of the source driver 120.

The source driver 120 also may couple to a gate driver integrated circuit (IC) 124 that may activate or deactivate rows of unit pixels 102 via the gate lines 104. As such, the source driver 120 may provide timing signals 126 to the gate driver 124 to facilitate the activation/deactivation of individual rows (e.g., lines) of pixels 102. In other embodiments, timing information may be provided to the gate driver 124 in some other manner. The display 18 may include a VCOM source 128 to provide a VCOM output to the common electrodes 112. In some embodiments, the VCOM source 128 may supply a different VCOM to different common electrodes 112 at different times. In other embodiments, the common electrodes 112 all may be maintained at the same potential (e.g., a ground potential) while the display 18 may be "ON."

Figure 8:
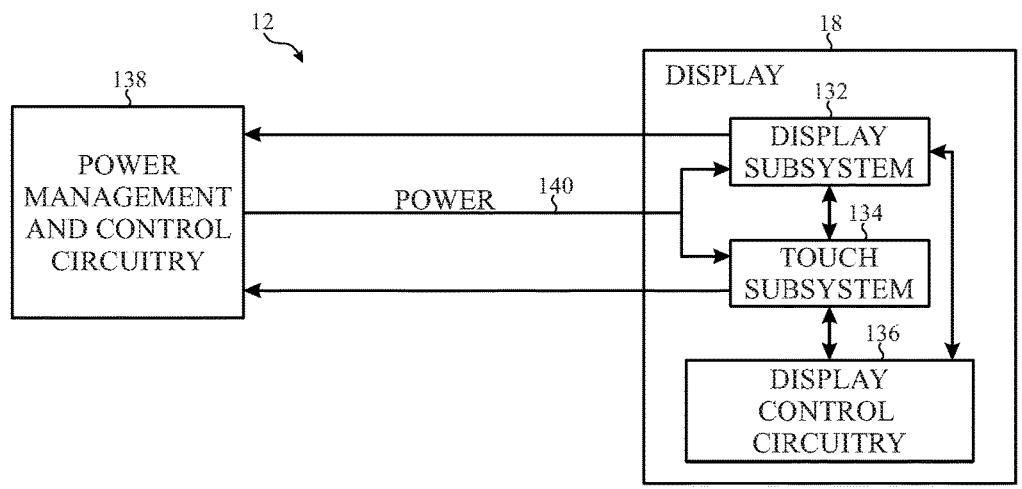
FIG. 8 is a block diagram of a power management and control circuitry and electronic display, in accordance with an embodiment.

Various components of the electronic device 10 may be used to control the power consumption of the display 18. For example, FIG. 8 illustrates an embodiment of a circuit diagram of certain components of the electronic device 10 that may be used to control the power consumption of the display 18. As illustrated, the electronic device 10 may include the display 18 and various processors 12. Specifically, the display 18 may include a display subsystem 132 and a touch subsystem 134. The display subsystem 132 may be used to receive and display image data, while the touch subsystem 134 may be used sense touches (e.g., user finger touches) of the display 18. In some embodiments, the display control circuitry 136 may be communicatively coupled to the display subsystem 132 and the touch subsystem 134. Although the display subsystem 132, the touch subsystem 134, and the display control circuitry 136 are illustrated separately, they are intended to indicate functionality of the display 18 as opposed to separate physical components of the display 18. Thus, physical components of the display 18 may be in one or more of the display subsystem 132, the touch subsystem 134, and the display control circuitry 136.

In certain embodiments, as further illustrated in FIG. 8, the processors 12 may include power management and control circuitry 138. The power management and control circuitry 138 may be used to manage the power of the electronic device 10, and may control when power is supplied to, and removed from, other components of the electronic device 10. For example, the power management and control circuitry 138 may supply a power and control signal 140 to the display 18. Indeed, as will be further appreciated with respect to FIGS. 10-15, the power management and control circuitry 138 may supply power 140 to both the display subsystem 132 and the touch subsystem 134 to provide an external power supply to the display subsystem 132 to prevent aberrant charges from accumulating on the pixels 102 during the time the display subsystem 132 is "OFF."

Figure 9:
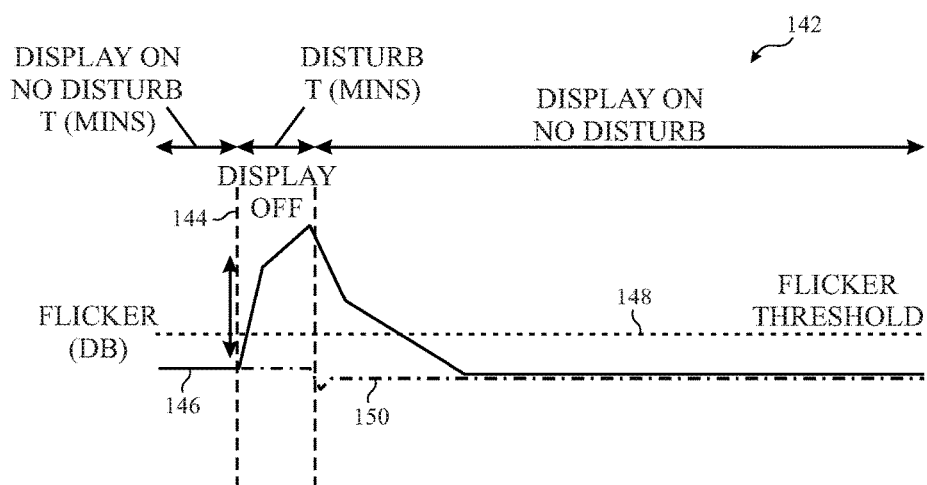
FIG. 9 is a timing diagram illustrating image flicker as a function of time, in accordance with an embodiment.

For example, in certain embodiments, when the display 18 is in the "OFF" mode (e.g., deactivated or temporarily inactive), any charge disturbance signal (e.g., which may be due to a user touch, EMI, and so forth) may cause image artifacts (e.g., flicker or other mura artifacts) to become apparent on the display 18 when turned back "ON." For example, as illustrated by the timing diagram 142 of FIG. 9, when a disturbance charge is detected or becomes apparent on the display 18 at, for example, time period 144, a charge signal 146 may rise above an acceptable flicker threshold level 148 when the display 18 switches from "OFF" (e.g., deactivated or temporarily inactive) to "ON" (e.g., active). Thus, as will described in further detail below, it may be useful to provide techniques for preventing disturbance charges and/or other aberrant charge from accumulating on the pixels 102 during the time the display subsystem 132 is "OFF." For example, by applying the presently disclosed techniques, a charge signal 150 may remain below the acceptable flicker threshold level 148 when the display 18 switches from "OFF" (e.g., deactivated or temporarily inactive) to "ON" (e.g., active).

Figure 10:
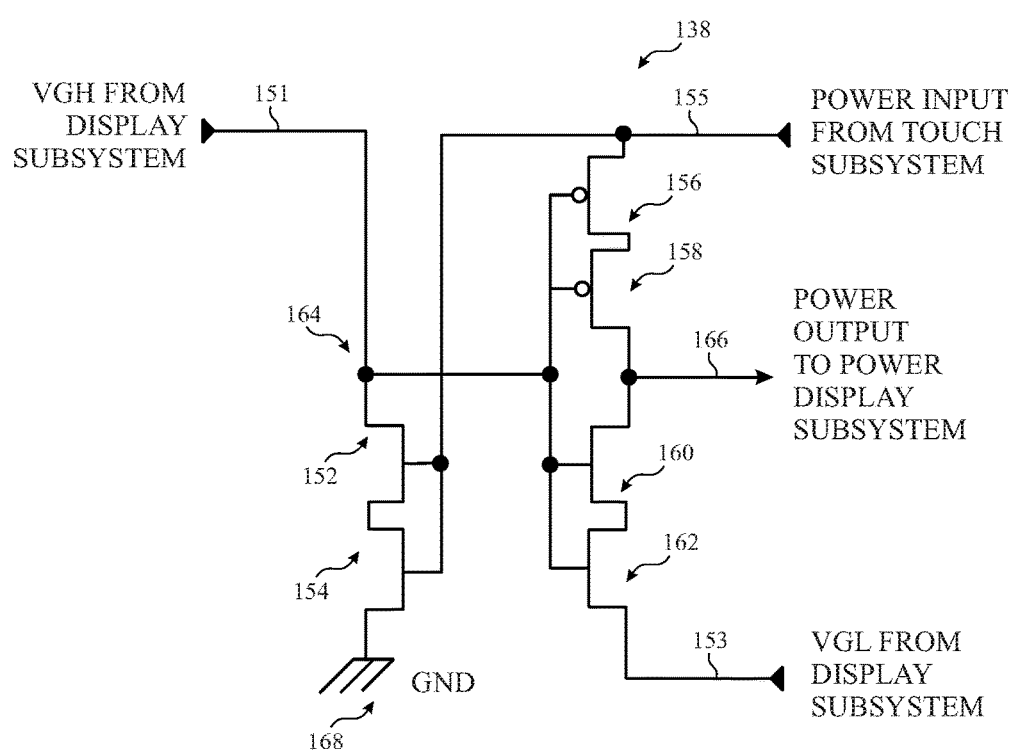
FIG. 10 is an equivalent circuit diagram illustrating an embodiment of the power management and control circuitry of FIG. 8, in accordance with an embodiment.

Turning now to FIG. 10, which illustrates an embodiment of a circuit diagram (e.g., equivalent circuit) of the power management and control circuitry 138 that may be used to prevent, for example, disturbance charges and/or other aberrant charge from accumulating on the pixels 102 during the time the display subsystem 132 is "OFF." In certain embodiments, as illustrated in FIG. 10, the power management and control circuitry 138 may receive an upper rail voltage signal 151 (e.g., "VGH" or positive polarity voltage value) and a lower rail voltage signal 153 (e.g., "VGL" or negative polarity voltage value) from the display subsystem 132. The power management and control circuitry 138 may also receive a voltage signal 155 from the touch subsystem 134. As further depicted, the power management and control circuitry 138 may also include, in some embodiments, one or more P-type metal-oxide-semiconductor (PMOS) transistors 156 and 158 coupled to one or more N-type metal-oxide-semiconductor (NMOS) transistors 160 and 162. In some embodiments, the PMOS transistor 158 and the NMOS transistor 162 may be redundant transistors that may increase signal integrity. The power management and control circuitry 138 may also include one or more transistors 152 and 154 included as part of the input circuitry that may be coupled to a ground 168.

In certain embodiments, based on, for example, the polarity and/or magnitude of the upper rail voltage signal 151 (e.g., "VGH") from the display subsystem 132 and the lower rail voltage signal 153 (e.g., "VGL") from the display subsystem 132 and/or the voltage signal 155 from the touch subsystem 134, the power management and control circuitry 138 may generate and output a gate signal output 166 to the display subsystem 132 to control the TFTs 108 of the pixel array 100 to turn "ON" and "OFF." For example, the power management and control circuitry 138 may provide the gate signal output 166 to the gates 116 of the TFTs 108 to discharge the pixels 102, such that any disturbance charge (e.g., due to voltages of the touch subsystem 134 coupling to the gates 116 of the TFTs 108 or other components of the display subsystem 132 during the time the display subsystem 132 is "OFF") or other aberrant charge may be discharged to the data lines 106. In this way, the possibility of image artifacts (e.g., mura artifacts, image sticking) becoming apparent on the display 18 may be reduced or substantially eliminated.

As a further example of the present embodiments, FIG. 11 depicts a logic table 170 that illustrates the operation of the power management and control circuitry 138. For example, row 172 illustrates an example of the inputs and outputs to the power management and control circuitry 138 may when the display subsystem 132 and the touch subsystem 134 are each "OFF." As depicted, when the upper rail voltage signal 151 (e.g., "VGH") and the lower rail voltage signal 153 (e.g., "VGL") from the display subsystem 132 and the voltage signal 155 from the touch subsystem 134 are each at ground voltage (e.g., "GND" or approximately 0V), the power management and control circuitry 138 may generate and output the gate signal output 166 at a ground voltage (e.g., "GND" or approximately 0V) to the display subsystem 132.

The row 174 of the logic table 170 illustrates an example of the operation of the power management and control circuitry 138 when the display subsystem 132 is "OFF" (e.g., deactivated or temporarily inactive) and the touch subsystem 134 is "ON" (e.g., active). Thus, the upper rail voltage signal 151 (e.g., "VGH") and the lower rail voltage signal 153 (e.g., "VGL") inputs may be at the ground voltage (e.g., "GND" or approximately 0V), while the voltage signal 155 from the touch subsystem 134 may be at an upper rail voltage (e.g., "V+"). It follows then that the power management and control circuitry 138 may output the gate signal output 166 at a voltage (e.g., "V+") to the display subsystem 132 to allow the TFTs 108 to turn "ON" and discharge any disturbance charge or other aberrant charge to the data lines 106.

The row 176 of the logic table 170 illustrates an example of the operation of the power management and control circuitry 138 when the display subsystem 132 and the touch subsystem 134 are each "ON" (e.g., active). Thus, the upper rail voltage signal 151 may be at the upper rail voltage (e.g., "VGH") and the lower rail voltage signal 153 (e.g., "VGL") inputs may be at the lower rail voltage (e.g., "VGL"). The voltage signal 155 from the touch subsystem 134 may show a zero voltage (e.g., 0V) indicating at time in which no user touch or other disturbance charge is detected by the touch subsystem 134. Thus, the gate signal output 166 of the power management and control circuitry 138 may be "pulled-down" to a lower rail voltage (e.g., "VGL") as illustrated. Specifically, the power management and control circuitry 138 may supply the lower rail voltage (e.g., "VGL") to the display subsystem 132, which would thus not cause the TFTs 108 to turn "ON."

The row 178 of the logic table 170 illustrates an example of the operation of the power management and control circuitry 138 when the display subsystem 132 and the touch subsystem 134 are each "ON" (e.g., active), and a user touch or other disturbance charge is detected by the touch subsystem 134. As depicted, the upper rail voltage signal 151 may be at the upper rail voltage (e.g., "VGH") and the lower rail voltage signal 153 (e.g., "VGL") inputs may be at the lower rail voltage (e.g., "VGL") while the voltage signal 155 from the touch subsystem 134 may be at an upper rail voltage (e.g., "V+"). However, because the display subsystem 132 is "ON" (e.g., active), any accumulated charge (e.g., accumulated charged that may contribute to image artifacts) on the pixels 102 may be discharged, for example, to the data lines 106. Thus, in such a case, the power management and control circuitry 138 may be inhibited. In this way, the possibility of image artifacts (e.g., mura artifacts, image sticking) becoming apparent on the display 18 may be reduced or substantially eliminated.

FIG. 12 illustrates signal plot 180, which illustrates a further example of the operation of the power management and control circuitry 138. For example, the power management and control circuitry 138 may provide the gate signal output 166 to the gates 116 of the TFTs 108 to discharge the pixels 102, such that any disturbance charge (e.g., due to voltages of the touch subsystem 134 coupling to the gates 116 of the TFTs 108 during the time the display subsystem 132 is "OFF") or other aberrant charge may be discharged to the data lines 106.

Figure 13:
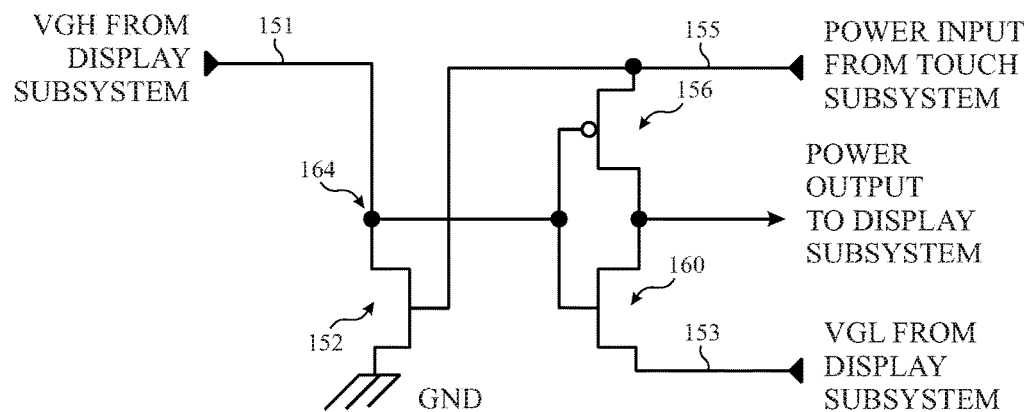
FIG. 13 is an equivalent circuit diagram illustrating another embodiment of the power management and control circuitry of FIG. 8, in accordance with an embodiment.

FIG. 13 illustrates another embodiment of a circuit diagram (e.g., equivalent circuit) of the power management and control circuitry 138 that may be used to prevent, for example, disturbance charges and/or other aberrant charge from accumulating on the pixels 102 during the time the display subsystem 132 is "OFF." The power management and control circuitry 138 of FIG. 13 may operate similar to that described above with respect FIG. 10. However, as illustrated by the embodiment of FIG. 13, the power management and control circuitry 138 may include the PMOS transistor 156 and the NMOS transistor 160 (e.g., complimentary metal-oxide-semiconductor (CMOS) inverter) to perform the present disturbance charge eliminating techniques, but may not include the redundant PMOS transistor 158 and the NMOS transistor 162. This embodiment may preserve area (e.g., circuit layout area).

Figure 14:
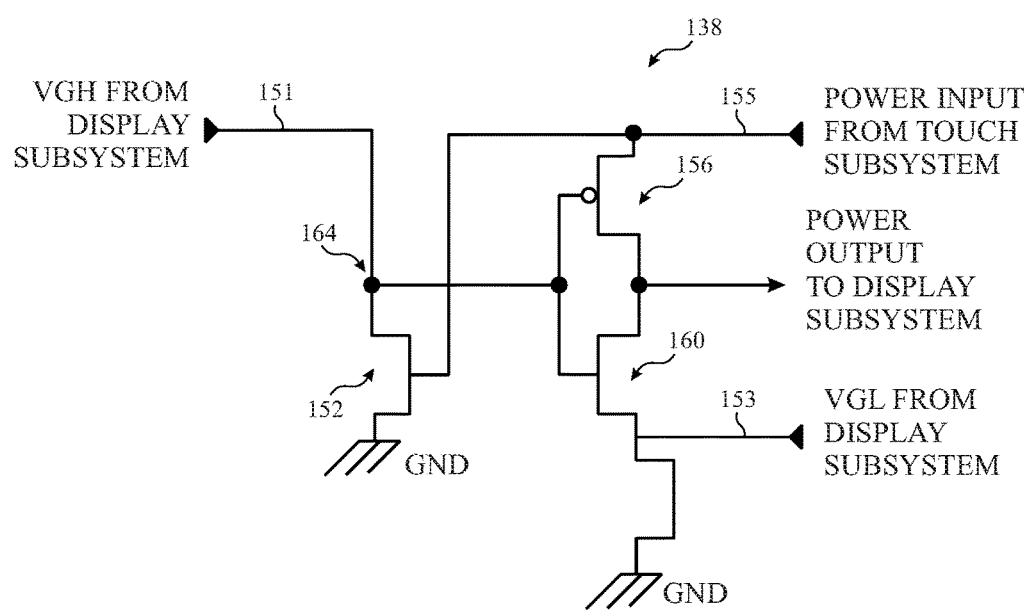
FIG. 14 is an equivalent circuit diagram illustrating another embodiment of the power management and control circuitry of FIG. 8, in accordance with an embodiment.

Similarly, FIG. 14 illustrates another embodiment of a circuit diagram (e.g., equivalent circuit) of the power management and control circuitry 138 that may be used to prevent, for example, disturbance charges and/or other aberrant charge from accumulating on the pixels 102 during the time the display subsystem 132 is "OFF." The power management and control circuitry 138 of FIG. 14 may operate similar to that described above with respect FIG. 14. However, as illustrated by the embodiment of FIG. 14, the PMOS transistor 156 and the NMOS transistor 160 (e.g., CMOS inverter) of the power management and control circuitry 138 may be tied to ground terminal ("GND.") to pull the power management and control circuitry 138 to ground when both the display subsystem 132 and the touch subsystem 134 are "ON."

Figure 15:
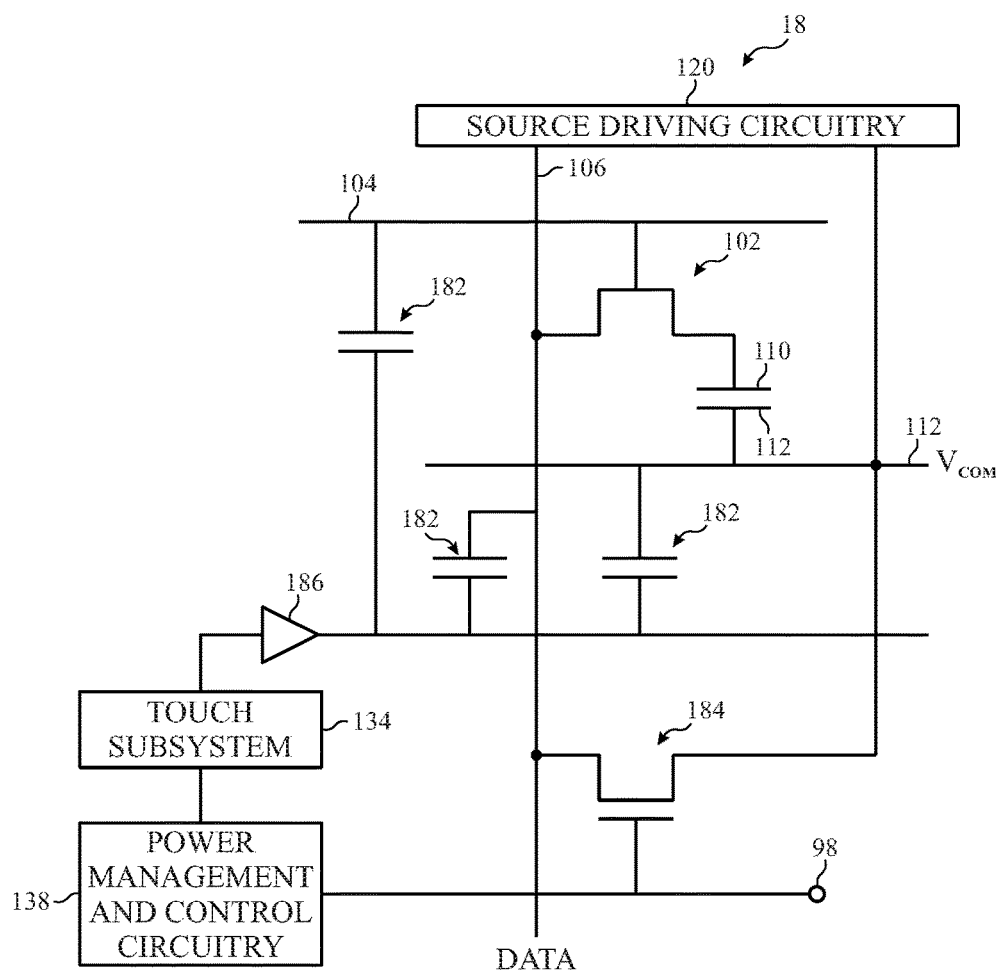
FIG. 15 is an equivalent circuit diagram of a unit pixel of the display of FIG. 1 including the power management and control circuitry of FIG. 8 and active switches, in accordance with an embodiment.

FIG. 15 illustrates an embodiment of a circuit diagram (e.g., equivalent circuit) of one of the unit pixels 102A-102F of the display 18 including, for example, the power management and control circuitry 138 included as part of the for example, the pixels 102A-102F and/or placed external to the unit pixels 102A-102F. As depicted, power management and control circuitry 138 may supply a signal to the display subsystem 132 and the touch subsystem 134, and, in some embodiments, an active switch 184 may included that may be useful in controlling the charge on the VCOM 112 and/or other components of the display 18. The power management and control circuitry 138 in conjunction with the active switch 184 may that any disturbance charges 182 (e.g., illustrated as capacitances due to a user touch or other disturbance generated via a touch drive amplifier 186) or other aberrant charge. Thus, the possibility of image artifacts becoming apparent on the display 18 may be reduced or substantially eliminated.

Figure 16:
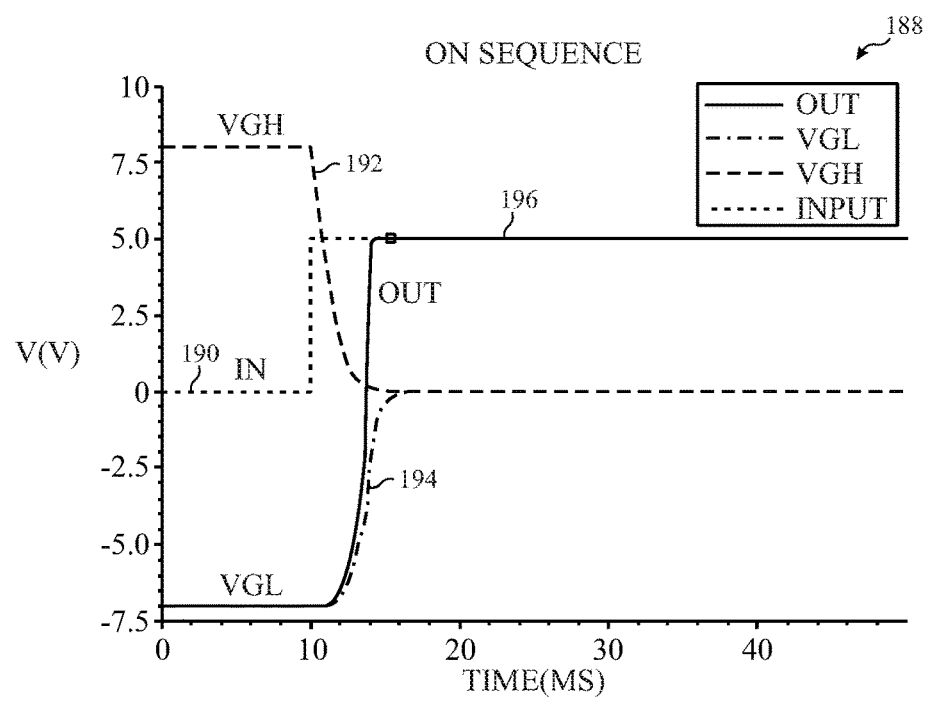
FIG. 16 illustrates a signal plot diagram based on the logic table of FIG. 11 including an "ON" sequence of the electronic display, in accordance with an embodiment.
Figure 17:
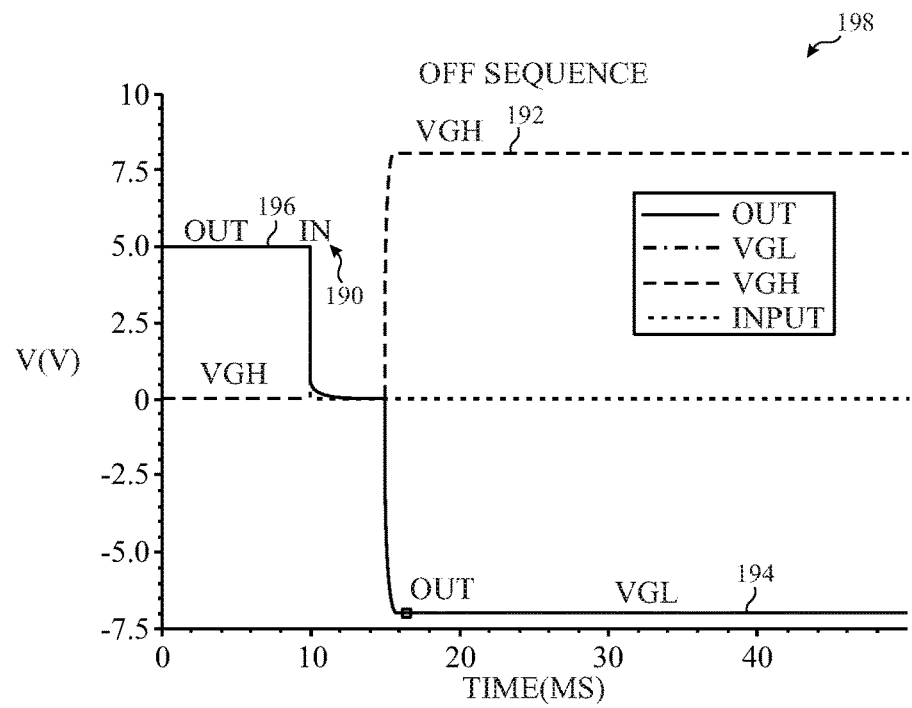
FIG. 17 illustrates a signal plot diagram based on the logic table of FIG. 11 including an "OFF" sequence of the electronic display, in accordance with an embodiment.

As a further example of the present embodiments, FIGS. 16 and 17 illustrate example simulation plots 188 and 198, which illustrate the "ON" sequence for the display subsystem 132 and the "OFF" sequence for the display subsystem 132, respectively. Specifically, FIGS. 16 and 17 illustrate the input signal 190 (e.g., "IN"), upper rail voltage signal 192 (e.g., "VGH"), lower rail voltage signal 194 (e.g., "VGL"), and the input signal 190 (e.g., "OUT") for the "ON" sequence and the "OFF" sequence for the display subsystem 132 (e.g., corresponding to the logic table 170).

Figure 18:
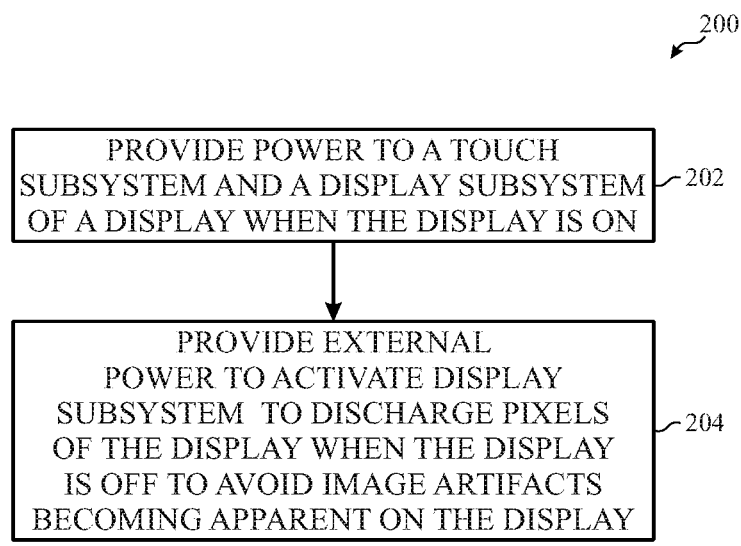
FIG. 18 is a flow diagram illustrating an embodiment of a process useful in preventing disturbance charges and/or other aberrant charges from accumulating on pixels of the electronic display during the time the electronic display is "OFF."

Turning now to FIG. 18, a flow diagram is presented, illustrating an embodiment of a process 200 useful in preventing disturbance charges and/or other aberrant charges from accumulating on the pixels 102 during the time the display 18 (particularly, the display subsystem 132) is "OFF." The process 200 may include code or instructions stored in a non-transitory machine-readable medium (e.g., the memory 14) and executed, for example, by the one or more processor(s) 12 and/or the circuitry depicted in FIGS. 8, 10, and 13-15. The process 200 may begin with the one or more processor(s) 12 and/or other circuitry activating (block 202) providing power to the touch subsystem 134 and a display subsystem 132 when the display 18 is "ON" (e.g., activated). The process 200 may then continue with the one or more processor(s) 12 and/or other circuitry (block 204) providing external power to activate the display subsystem 132 to discharge the pixels 102 when the display 18 is "OFF" to avoid image artifacts (e.g., due to a user touch of the display 18 and/or EMI) becoming apparent on the display 18 when the display 18 is turned back "ON." In this way, the possibility of image artifacts becoming apparent on the display 18 may be reduced or substantially eliminated.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
    power management and control circuitry configured to:
        receive a first voltage signal from a display subsystem of a display of the electronic device, wherein the first voltage signal comprises an indication of whether the display subsystem is in an activated state or a temporarily inactive state, and wherein the display subsystem displays images in the activated state and does not display images in the temporarily inactive state;
        receive a second voltage signal from a touch subsystem of the display, wherein the second voltage signal comprises an indication of a touch operation of the display; and
        provide a discharging signal to the display subsystem to activate a discharging process in the display subsystem when the display subsystem is in the temporarily-inactive state and the touch subsystem is in an active state, wherein providing the discharging signal to the display subsystem causes the display subsystem to discharge an aberrant charge based at least in part on the first voltage signal and the second voltage signal.

2. The electronic device of claim 1, wherein the power management and control circuitry is configured to receive a third voltage signal from the display subsystem, wherein the third voltage signal comprises an indication of whether the display subsystem is in an activated state or the temporarily inactive state.

3. The electronic device of claim 1, wherein the power management and control circuitry is configured to provide an upper rail voltage signal as the discharging signal to enable the power management and control circuitry to generate and output a gate signal to the display subsystem to turn ON pixel transistors of the display of the electronic device to discharge the aberrant charge when the display subsystem is determined to be in the temporarily inactive state.

4. The electronic device of claim 1, wherein the power management and control circuitry is configured to be inhibited when the display subsystem and the touch subsystem are each in an activated state.

5. The electronic device of claim 1, wherein discharging the aberrant charge comprises preventing a possible occurrence of image artifacts from becoming apparent on the display.

6. The electronic device of claim 1, wherein discharging the aberrant charge comprises discharging a disturbance charge based on a user touch of the display of the electronic device or electromagnetic interference (EMI).

7. The electronic device of claim 1, wherein the power management and control circuitry is configured to disable control of the electronic device when discharging the aberrant charge based on the second voltage signal.

8. A display panel, comprising:
a first transistor having a first terminal directly coupled to a first voltage line of a touch subsystem of the display panel, a first gate directly coupled to a first voltage line of a display subsystem of the display panel, and a second terminal; and
a second transistor having a first terminal directly coupled to the second terminal of the first transistor, a second gate directly coupled to the first voltage line of the display subsystem, and a second terminal directly coupled to a second voltage line of the display subsystem, wherein the first transistor or the second transistor is configured to provide a power signal to the display subsystem to activate a discharging process in the display subsystem when the first voltage line of the touch subsystem provides an activation voltage signal, wherein the activation voltage signal comprises an indication of a touch operation of the touch subsystem of the display panel, and when the first voltage line and the second voltage line of the display subsystem each provides a ground voltage signal, wherein the ground voltage signal comprises an indication of whether the display subsystem is in an activated state or a temporarily inactive state.

9. The display panel of claim 8, wherein the first transistor comprises a p-type metal-oxide-semiconductor (PMOS) transistor.

10. The display panel of claim 8, wherein the second transistor comprises an n-type metal-oxide-semiconductor (NMOS) transistor.

11. The display panel of claim 8, comprising a third transistor directly coupled in series between the first transistor and the second transistor, and wherein the third transistor comprises a p-type metal-oxide-semiconductor (PMOS) transistor.

12. The display panel of claim 11, comprising a fourth transistor having a first terminal directly coupled to the second terminal of the second transistor and a second terminal directly coupled to the second voltage line of the display subsystem, and wherein the fourth transistor comprises a n-type metal-oxide-semiconductor (NMOS) transistor.

13. The display panel of claim 8, wherein the first transistor or the second transistor is configured to provide the power signal to the display subsystem to discharge an aberrant charge based at least in part on the activation voltage signal of the touch subsystem.

14. The display panel of claim 8, wherein the first transistor or the second transistor is configured to provide the power signal to the display subsystem to prevent a possible occurrence of image artifacts from becoming apparent on the display panel.

15. A method, comprising:
providing, via a display subsystem, a first signal comprising an indication of whether the display subsystem is in an activated state or a temporarily inactive state, wherein the display subsystem displays images in the activated state and does not display images in the temporarily inactive state;
providing, via a touch subsystem, a second signal comprising an indication of detection of one or more touch operations of the touch subsystem of an electronic display; and
providing external power to the display subsystem when the display subsystem is in the temporarily inactive state and the touch subsystem is in an active state to activate a discharging process in the display subsystem to discharge an aberrant charge on one or more pixels of the electronic display based on the first signal and the second signal, wherein discharging the aberrant charge comprises preventing a possible occurrence of image artifacts from becoming apparent on the electronic display.

16. The method of claim 15, comprising providing a ground voltage signal to the display subsystem when the electronic display is in the activated state.

17. The method of claim 15, wherein power is provided to the touch subsystem to detect the one or more touches of the electronic display when the display subsystem is in the activated state and the temporarily inactive state.

18. The method of claim 15, comprising providing the external power to the display subsystem based at least in part on an upper rail voltage signal of the display subsystem, a lower rail voltage signal of the display subsystem, a touch voltage signal of the touch subsystem, or a combination thereof.

19. The method of claim 15, comprising disabling control of the display subsystem during the discharge of the aberrant charge on the one or more pixels of the electronic display.

* * * * *